Figure 1:
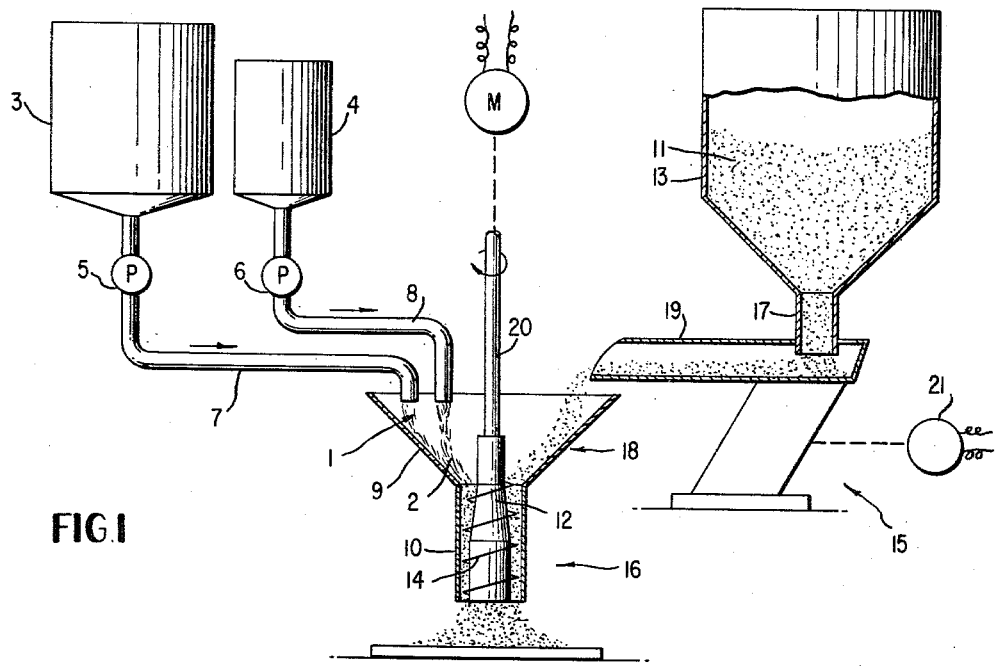

May 18, 1965     T. S. LOESER     3,184,112
SYSTEM FOR ADMIXING AND DISCHARGING PARTICULATE MATERIAL
Filed Dec. 7, 1961

INVENTOR.
THEODORE S. LOESER

ATTORNEY

3,184,112
SYSTEM FOR ADMIXING AND DISCHARGING PARTICULATE MATERIAL
Theodore S. Loeser, New Brunswick, N.J., assignor to Union Carbide Corporation, a corporation of New York
Filed Dec. 7, 1961, Ser. No. 157,648
7 Claims. (Cl. 222—136)

This invention relates to a system for admixing and discharging measured quantities of material. More particularly, this invention relates to a system which is especially useful for admixing thermosetting resins, as for example, epoxy resins, with curing agents therefore and with solid, particulate material, such as fillers, to form troweling compositions, and for discharging the troweling compositions thus formed.

An epoxy resin troweling composition is a highly filled, viscous formulation, similar to cement and plaster, which is applied as a protective coating to various surfaces, for instance, concrete surfaces. In formulating an epoxy resin troweling composition, an epoxy resin, a curing agent for the epoxy resin, a filler and, if desired, other modifiers such as pigments, are thoroughly admixed, with the curing agent added to the composition just prior to the time at which the composition is to be troweled onto the desired surface. The curing agent is added to the composition just prior to the time at which the composition is to be applied in view of the fact that once the curing agent is added, the composition begins to advance toward an infusible, unworkable state. The time required for the composition to cure to an infusible, unworkable product, measured from the instant that the curing agent is added to the instant that the composition cures to an infusible, unworkable product, is known as the "pot life" of the composition. Since the "pot life" of epoxy troweling compositions is relatively short, formulation of such compositions must be accomplished in the field, that is, at the locale at which the composition is to be used.

In the field, materials are proportioned out separately simply by estimation, or in those instances in which scales are available, weighed out separately on a scale and then admixed together. Admixing is accomplished by hand or by a power driven mixer when such power driven mixer is available. Using a scale to weigh out materials is slow and time consuming while proportioning out materials by estimating amounts thereof is extremely inaccurate. As is well-known, unless a thermosetting resin, such as an epoxy resin, is admixed with a curing agent in certain well defined proportions, the infusible, unworkable product ultimately obtained is characterized by poor physical properties.

The present invention relates to a system for admixing and discharging measured quantities of materials, including at least one solid, particulate material, which system, (1) provides for accurate proportioning of materials to be admixed; (2) provides for uniform admixing of the proportioned materials; (3) provides for admixing and discharging of proportioned quantities of materials in a manner which is more economical than those previously used in that the system of this invention can be operated at a discharge rate which is commensurate with the rate at which the admixed materials can be troweled; (4) eliminates the hand labor previously required in order to measure out desired quantities of materials and (5) eliminates the hand labor previously required in order to admix proportioned quantities of materials in those instances in which power driven mixers were unavailable. Furthermore, the system of the present invention can be made portable by mounting the elemnts thereof in a common housing.

Figure 2:
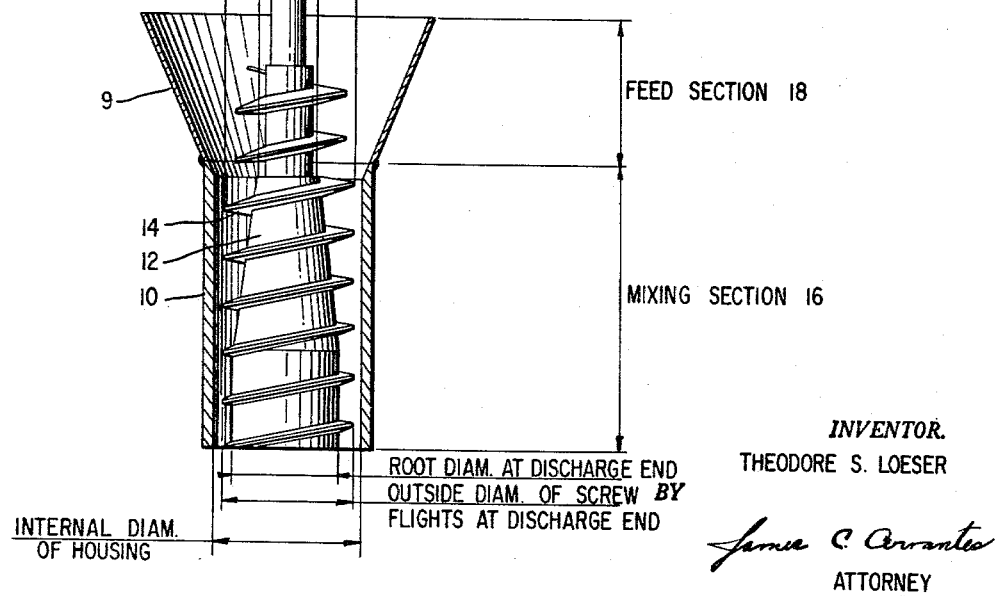

Reference is now made to the accompanying drawing which, along with the discussion that follows, will more fully describe the present invention and wherein:

FIGURE 1 is a schematic view of one embodiment of the system of this invention, and FIGURE 2 is a view, in section, of one embodiment of the admixing screw of this system.

For convenience, the present invention will be described in reference to admixing and discharging proportioned quantities of a liquid epoxy resin, a liquid curing agent for the epoxy resin and solid, particulate material.

A liquid epoxy resin 1 is pumped from container 3, by means of positive displacement, volumetric metering pump 5, through conduit 7 into vertically disposed funnel-shaped chute 9 which forms feed section 18 for materials which are to be admixed. Metering pump 5, when in operation, meters a uniform and constant volumetric flow of epoxy resin 1 from container 3 into feed section 18, defined by chute 9, through conduit 7.

Similarly and simultaneously, liquid curing agent 2 is pumped from container 4, by means of positive displacement, volumetric metering pump 6, through conduit 8 into feed section 18. The discharge rate of each volumetric metering pump can be increased or decreased by increasing or by decreasing the speed at which each pump is operating.

The volumetric displacement of each metering pump can be the same, as shown in the accompanying drawing, or it can be different. The ratio of volumetric quantities of liquids which are being metered to feed section 18, defined by chute 9, by metering pumps can be varied, as desired, by: using metering pumps of different volumetric displacement and operating each metering pump at the same speed; using metering pumps having the same volumetric displacement and operating each pump at a different speed; or using metering pumps having different volumetric displacements and operating each pump at different speeds.

The clearance between the impeller (not shown) and the impeller housing of each metering pump can also be the same or different. With the present system, clearances as great as 0.003 of an inch can be tolerated, when metering liquids ranging in viscosity of from about 200 centipoises to about 8,000 centipoises at 25° C., without affecting the accuracy of the system.

Volumetric metering pumps 5 and 6 can be simultaneously driven through a common drive (not shown), for example a gear train, which in turn is mechanically driven by a variable speed motor (not shown). Gear ratios of gear train (not shown) can be changed, as desired, in order to change the speed at which each pump is operating thus varying the ratio of the volumetric quantities of liquids fed to chute 9. Alternatively volumetric metering pumps 5 and 6 can be operated independently of each other provided that they are synchronized to deliver the desired volumetric quantities of liquid to chute 9.

Operation of volumetric metering pumps 5 and 6 is usually manually controlled. If desired, however, these pumps can be automatically controlled by devices (not shown) which sense the flow of liquids, and in response thereto, stop or start the pumps or vary the speed at which the pumps are operating.

Conduits through which epoxy resin 1 and curing agent 2 are fed to volumetric metering pumps 5 and 6 can be provided with strainers (not shown) to insure elimination from the liquids of any material which might tend to clog the system, interrupting its effective and continuous operation. Also, if desired, the conduits can be provided with heaters (not shown) on the intake side of volumetric metering pumps 5 and 6 which can be used to heat one or more of the liquids, reducing the viscosity thereof to the desired value. Rather than positioning heaters on the intake side of volumetric metering pumps 5 and 6, heaters can also be positioned on both the intake side and the discharge side of each volumetric metering pump. Rather than using heaters as described, the liquids can be heated in their containers.

Simultaneously with the pumping of epoxy resin 1 and curing agent 2 into feed section 18 defined by chute 9, solid, particulate material 11 is also fed into feed section 18 from bin 13. For this purpose it is convenient to use vibrating type feeder 15 which feeds solid, particulate material 11 into feed section 18 after having received solid, particulate material 11 from bin 13 through its spout 17.

As is shown in FIGURE 1, vibrating feeder 15, which is detachably connected to bin 13 through its spout 17, is made up of vibrating trough 19 and electro-magnetic means 21. Electro-magnetic means 21 vibrates vibrating trough 19 at the desired amplitude thus delivering the desired amount of solid, particulate material into feed section 18. Other means for feeding solid, particulate material to chute 9 can be employed so long as the feed of solid, particulate material can be maintained at about plus or minus about 10 percent per hour of the desired weight.

Chute 9, which defines the feed section into which epoxy resin 1, curing agent 2 and solid, particulate material 11 are fed, is generally funnel-like in shape. Its shape, however, is not critical. Chute 9 serves to receive material from their supply points and to funnel the materials into vertically disposed cylindrical housing 10 in which there is rotatably mounted admixing and metering screw 12, shown in detail in FIGURE 2 of the accompanying drawing. As a rule, chute 9 and housing 10 are one integral part, although they can be made detachable if so desired. Housing 10, in which there is rotatably mounted admixing and metering screw 12 is usually cylindrical in shape, as is shown in both FIGURES 1 and 2. Its exact shape will depend, of course, upon the configuration of the screw which it houses.

The length of admixing and metering screw 12 within housing 10, which also defines vertically disposed mixing section 16, is equal in length to the length of housing 10. The length of admixing and metering screw 12, within mixing section 16, is also numerically greater by about 1.5 times the internal diameter of housing 10, generally about 1.5 to 5 times greater and preferably 2 times greater. An admixing and metering screw having a length, as described, of about 1.5 to about 5 times the numerical value of the internal diameter of the housing within which it is rotatably mounted, is particularly desirable for admixing epoxy resins with curing agents and fillers. With such a screw the residence time of the materials within the mixing section can be made relatively short thus insuring that the compositions will still be fusible and workable when discharged therefrom.

Admixing and metering screw 12 has screw flights 14 which run its entire length in mixing section 16. Screw flights 14 serve to convey materials from feed section 18 along mixing section 16 and to finally discharge the admixed materials out of mixing section 16. For purposes of facilitating movement of materials from feed section 18 into mixing section 16, screw flights can be extended onto that portion of screw 12 which is in feed section 18, as shown in FIGURE 2. Screw flights in feed section 18 can be the same or of a different configuration than screw flights in mixing section 16.

The exact configuration of admixing and metering screw 12, that is, its root diameter at both ends of mixing section 16; and the exact configuration of screw flights 14, that is, the depth of the screw flights and also the pitch of the screw flights at both ends of mixing section 16 are such that the volumetric compression ratio of the screw is at least about 2 to about 10 to 1, preferably about 2 to about 6 to 1. Pitch of screw flights is the distance between 2 consecutive flights.

Volumetric compression ratio is calculated by means of the following formula:

$$\text{Volumetric compression ratio} = \frac{\pi \left( \begin{array}{c} \text{outside diameter of screw} \\ \text{flights at feed end of} \\ \text{mixing section} \end{array} \right)^2 A - \pi \left( \begin{array}{c} \text{screw root diameter} \\ \text{at feed end of mix-} \\ \text{ing section} \end{array} \right)^2 A}{\pi \left( \begin{array}{c} \text{outside diameter of screw} \\ \text{flights at discharge end} \\ \text{of mixing section} \end{array} \right)^2 B - \pi \left( \begin{array}{c} \text{screw root diameter} \\ \text{at discharge end of} \\ \text{mix-section} \end{array} \right)^2 B}$$

wherein
A equals the pitch of the screw flights at the feed end of mixing section and B equals the pitch of the screw flights at the discharge end of the mixing section. $\pi = 3.142$.

The volumetric compression ratio indicates the amount of material taken into the mixing section per one resolution of the admixing and metering screw as opposed to the amount of material discharged from the mixing section per one revolution of the admixing and metering screw. A volumetric compression ratio of from about 2 to about 10 to 1 indicates that from about 2 to about 10 times more material (on a volume basis) is taken into the mixing section than discharged therefrom.

Admixing and metering screw 12, being rotatably mounted in housing 10, must of necessity be spaced from the interior walls thereof. As a rule, clearance between screw flights 14 and the interior wall of housing 10 is about 1/16 to about 8 times and preferably about 3 to about 6 times the diameter of the largest solid particle being admixed.

Rotation of admixing and metering screw 12 is conveniently accomplished through drive shaft 20 which in turn is driven by motor M. For flexibility of operation motor M should be of variable speed so that the mix can be discharged from mixing section 16 at the rate needed for immediate use.

OPERATION

In operation of the system of this invention, volumetric metering pumps 5 and 6 are set to operate at a speed such that the desired volumetric quantities of epoxy resin 1 and curing agent 2 are delivered to feed section 18. The amplitude of vibrating trough 19 is also set so that when vibrating, trough 19 is feeding solid, particulate material into feed section 18 in desired quantities. The speed at which volumetric metering pumps 5 and 6 are set to operate and the amplitude at which vibrating trough 19 is set to vibrate, are such that not only are the materials fed into feed section 18 in desired proportions, but, in addition, the total amount of materials is such that screw flights in mixing section 16 are substantially completely filled when the system is in operation.

Rotation of admixing and metering screw 12 is started and thereafter volumetric metering pumps 5 and 6 and vibrating trough 19 set into operation. Materials are fed into feed section 18 and then passed into mixing section 16 wherein they are admixed and from whence they are discharged as a thoroughly admixed composition. Once the system is operating smoothly with the screw flights in mixing section 16 substantially completely filled, the admixing and metering screw is then adjusted to the desired discharge rate.

Although the present system has been described with respect to the admixing of an epoxy resin, such as diglycidyl ether of 2,2-bis-(p-hydroxyphenyl-propane, with a curing agent and solid, particulate material, other resins such as polyurethanes, polyesters and mixtures thereof can be used in lieu of the epoxy resin. The particular curing agent will depend upon the type of resin which is used. For epoxy resins, it is customary to use amine curing agents such as are described in U.S. Patent 2,901,461 to V. Auerbach et al. incorporated herein by reference. The resins and curing agents can also contain fillers, pigments and other modifying agents which are well-known in the art. Also the system of the present invention can be used to admix and meter various other materials. For example, it could be used to admix materials such as sand, plaster and water with one another.

The following examples further illustrate the present invention and are not intended to limit the scope thereof in any manner.

*Example I*

The system shown in FIGURE 1 of the accompanying drawing was used to admix a liquid epoxy resin, a liquid curing agent therefore and solid, particulate material and to discharge the admixed materials.

Description of the materials admixed, the type of admixing and metering screw used as well as other details of the system are noted below.

Liquid diglycidyl ether of 2,2-bis(p-hydroxyphenyl) propane was fed into feed section 18 at a rate of 7.2 pounds per hour using a Zenith volumetric metering pump, size 2. N-hydroxyethyl diethylenetriamine was fed into feed section 18 at a rate of 1.8 pounds per hour using a Zenith volumetric metering pump, size 0.5. The volumetric ratio of epoxy to curing agent was 3.93 to 1. Sand having a maximum particle size of 0.027 inch in diameter was fed into feed section 18 at a rate of 13 pounds per hour using a Model-F-TO syntrion vibrator. The materials so fed into feed section 18 passed into mixing section 16, defined by cylindrical housing 10, wherein there was rotatably mounted admixing and metering screw 12. The dimensions of the cylindrical housing 10 and screw 12 were as follows.

Cylindrical housing (barrel):
   Internal diameter _____ 1.75 inches.
   Length _____ 4 inches.
   Clearance between housing and
      screw flights _____ ⅛ of an inch.
Screw:
   Outside diameter of screw flights
      (both ends) _____ 1.5 inches.
   Length (in mixing section) _____ 4 inches.
   Pitch of screw flights (in mixing section—both ends) _____ ¾ of an inch.
   Root diameter—
      Feed end _____ 9/10 of an inch.
      Discharge end _____ 1⅜ inches.
   Screw speed _____ 40 revolutions per minute.
   Volumetric compression ratio _____ 5.9 to 1.

With the system operating as described, 22 pounds per hour of well mixed material was discharged.

The screw noted in this example also had screw flights, having a pitch of ¾ of an inch, extending ¼ of an inch into feed section 18.

*Example II*

This example was conducted using the system described in Example I. The materials admixed, the rates at which the materials were fed into feed section 18 and the configuration of screw 12 and housing 10 are described below.

Rate fed into feed section,
Materials: pounds per hour
   Liquid diglycidyl ether of 2,2-bis-(p-hydroxyphenyl)propane _____ 89
   N-hydroxyethyl diethylene triamine _____ 23
   Aluminum oxide having a maximum particle size of about 0.027 inch in diameter _____ 561

The volumetric ratio of epoxy to curing agent was 3.86 to 1.

Cylindrical housing (barrel):
   Internal diameter _____ 3 1/16 inches.
   Length _____ 6 inches.
   Clearance between housing and screw
      flights _____ 5/32 of an inch.
Screw:
   Outside diameter of screw flights
      (both ends) _____ 2.75 inches.
   Length (in mixing section) _____ 6 inches.
   Pitch of screw flights (in mixing section—both ends) _____ 1.5 inches.
   Root diameter—
      Feed end _____ 1⅛ inches.
      Discharge end _____ 2¼ inches.
   Screw speed _____ 45 revolutions per minute.
   Volumetric compression ratio _____ 2.45 to 1.

With the system operating as described, 673 pounds per hour of well mixed material was discharged.

The screw noted in this example also had screw flights, having a pitch of 1.5 inches, extending 2 inches into feed section 18.

*Example III*

This example was conducted using the system described in Example I. The materials admixed, the rates at which the materials were fed into section 18 and the configuration of screw 12 and housing 10 are described below.

Rate fed into feed section,
Materials: pounds per hour
   Mixture of liquid digylcidyl ether of 2,2-bis-(p-hydroxyphenyl)propane and titanium dioxide with the titanium dioxide being present in 7 percent by weight _____ 35
   N-hydroxyethyl diethylene-triamine _____ 7
   Perlite _____ 32.3
   Mixture of marble chips and sand _____ 290.7

The volumetric ratio of epoxy to curing agent was 5 to 1.

Cylindrical housing (barrel):
   Internal diameter _____ 3 1/16 inches.
   Length _____ 6 inches.
   Clearance between housing and
      screw flights _____ 5/32 of an inch.
Screw:
   Outside diameter of screw flights
      (both ends) _____ 2.75 inches.
   Length (in mixing section) _____ 6 inches.
   Pitch of screw fligfts (in mixing section—both ends) _____ 1 inch.
   Root diameter—
      Feed end _____ 1¼ inches.
      Discharge end _____ 2¼ inches.
   Screw speed _____ 100 revolutions per minute.
   Volumetric compression ratio ____ 4.06 to 1.

With the system operating as described, 365 pounds per hour of well mixed material was discharged.

The perlite and the mixture of marble chips and sand each had a maximum particle size of 0.027 inch in diameter.

The screw noted in this example also had screw flights, having a pitch of 1 inch, extending 2 inches into feed section 18.

In the claims:

1. In a system which is particularly adaptable for metering, admixing and discharging materials at least one of which is solid particulate material and another of which is a thermosetting material, means for feeding proportioned amounts of said materials to a vertically disposed mixing section wherein said materials are admixed and from whence said admixed materials are discharged, said mixing section comprising: a housing, a metering screw rotatably mounted in said housing which admixes and conveys said material through said mixing section the length of said metering screw in said housing being at least about 1.5 times greater than the internal diameter of said housing, and screw flights on said metering screw running the entire length thereof in said housing, the clearance between said screw flights and said housing being about 1/16 to about 8 times the diameter of the largest particle of said particulate material, the root diameter of said metering screw being greater at the discharge end of said mixing section than at the feed end thereof with the configuration of the screw root and of the screw flights of said screw being such that the volumetric compression ratio thereof is about 2 to about 10 to 1.

2. A system as described in claim 1 wherein the volumetric compression ratio of said metering screw is about 2 to about 6 to 1.

3. In a system which is particularly adaptable for metering, admixing and discharging materials at least one of which is solid, particulate material and another of which is a thermosetting material, means for feeding proportioned amounts of said materials to a vertically disposed mixing section wherein said materials are admixed and from whence said admixed materials are discharged, said mixing section comprising: a housing, a metering screw rotatably mounted in said housing which admixes and conveys said material through said mixing section, the length of said metering screw in said housing being about 1.5 to about 10 times greater than the internal diameter of said housing, and screw flights on said metering screw running the entire length thereof in said housing, the clearance between said screw flights and said housing being about 1/16 to about 8 times the diameter of the largest particle of said particulate material, the root diameter of said metering screw being greater at the discharge end of said mixing section than at the feed end thereof with the configuration of the screw root and of the screw flights of said screw being such that the volumetric compression ratio thereof is about 2 to about 10 to 1.

4. In a system which is particularly adaptable for metering, admixing and discharging materials at least one of which is solid, particulate material and another of which is a thermosetting material, means for feeding proportioned amounts of said materials to a vertically disposed mixing section wherein said materials are admixed and from whence said admixed materials are discharged, said mixing section comprising: a housing, a metering screw rotatably mounted in said housing which admixes and conveys said material through said mixing section, the length of said metering screw in said housing being about 1.5 to about 5 times greater than the internal diameter of said housing, and screw flights on said metering screw running the entire length thereof in said housing, the clearance between said screw flights and said housing being about 3 to about 6 times the diameter of the largest particle of said particulate material, the root diameter of said metering screw being greater at the discharge end of said mixing section than at the feed end thereof with the configuration of the screw root and of the screw flights of said screw being such that the volumetric compression ratio thereof is about 2 to about 6 to 1.

5. In a system which is particularly adaptable for metering, admixing and discharging materials at least one of which is solid, particulate material and another of which is a thermosetting material, means for feeding proportioned amounts of said materials to a vertically disposed mixing section wherein said materials are admixed and from whence said admixed materials are discharged, said mixing section comprising: a housing, a metering screw rotatably mounted in said housing which admixes and conveys said material through said mixing section, the length of said metering screw in said housing being about 1.5 to about 2 times greater than the internal diameter of said housing, and screw flights on said metering screw running the entire length thereof in said housing, the clearance between said screw flights and said housing being about 3 to about 6 times the diameter of the largest particle of said particulate material, the root diameter of said metering screw being greater at the discharge end of said mixing section than at the feed end thereof with the configuration of the screw root and of the screw flights of said screw being such that the volumetric compression ratio thereof is about 2 to about 6 to 1.

6. In a system which is particularly adaptable for metering, admixing and discharging materials, at least one of which is solid particulate material and another of which is a thermosetting material, a vertically disposed feed section, means for feeding proportioned amounts of said materials to said feed section, a vertically disposed mixing section in communication with said feed section with said passing from said feed section into said mixing section, said mixing section comprising: a housing, a metering screw rotatably mounted in said housing which admixes and conveys said material through said mixing section, the length of said metering screw in said housing being about 1.5 to about 10 times greater than the internal diameter of said housing, and screw flights on said metering screw running the entire length thereof in said housing, the clearance between said screw flights and said housing being about 1/16 to about 8 times the diameter of the largest particle of said particulate material, the root diameter of said metering screw being greater at the discharge end of said mixing section than at the feed end thereof the configuration of the screw root and of the screw flights of said screw being such that the volumetric compression ratio thereof is about 2 to about 10 to 1.

7. In a system which is particularly adaptable for metering, admixing and discharging materials at least one of which is solid particulate material and another of which is a thermosetting material, a vertically disposed funnel-shaped chute defining a feed section, means for feeding proportioned amounts of said materials to said feed section, a vertically disposed cylindrical housing smoothly secured to said chute and defining a mixing section which is in communication with said feed section, with said material passing from said feed section into said mixing section, a metering screw rotatably mounted in said housing which admixes and conveys said material through said mixing section, the length of said metering screw in said housing being about 1.5 to about 10 times greater than the internal diameter of said housing, and screw flights on said metering screw running the entire length thereof in said housing, the clearance between said screw flights and said housing being about 1/16 to about 8 times the diameter of the largest particle of said particulate material, the root diameter of said metering screw being greater at the discharge end of said mixing section than at the feed end thereof the configuration of the screw root and of the screw flights of said screw being such that the volumetric compression ratio thereof is about 2 to about 10 to 1.

References Cited by the Examiner

UNITED STATES PATENTS

| | | | |
|---|---|---|---|
| 505,758 | 9/93 | Faith | 222—413 |
| 2,104,197 | 1/38 | Johansen | 100—145 |
| 2,260,302 | 10/41 | Driscoll et al. | 222—413 |
| 2,864,537 | 12/58 | Throop et al. | 222—145 X |
| 2,971,679 | 2/61 | Pavia | 222—142 |
| 3,067,987 | 12/62 | Ballou et al. | 222—145 X |
| 3,071,293 | 1/63 | Lewis-Smith et al. | 222—X |

FOREIGN PATENTS 22,281   10/06   Great Britain.

RAPHAEL M. LUPO, *Primary Examiner.*

LAVERNE D. GEIGER, LOUIS J. DEMBO,
*Examiners.*

UNITED STATES PATENT OFFICE
CERTIFICATE OF CORRECTION

Patent No. 3,184,112　　　　　　　　　　　　　　　　　May 18, 1965

Theodore S. Loeser

It is hereby certified that error appears in the above numbered patent requiring correction and that the said Letters Patent should read as corrected below.

Column 3, line 51, for "1.5 to 5 times" read -- 1.5 to about 5 times --; column 4, lines 20 and 21, for "resolution" read -- revolution --; column 6, line 45, for "fligfts" read -- flights --; column 8, line 15, before "passing" insert -- material --.

Signed and sealed this 26th day of October 1965.

(EAL)
Attest:

ERNEST W. SWIDER
Attesting Officer

EDWARD J. BRENNER
Commissioner of Patents